July 3, 1934.  W. J. IRWIN  1,965,462
MEAT TENDERING MACHINE
Filed Dec. 8, 1931  4 Sheets-Sheet 2
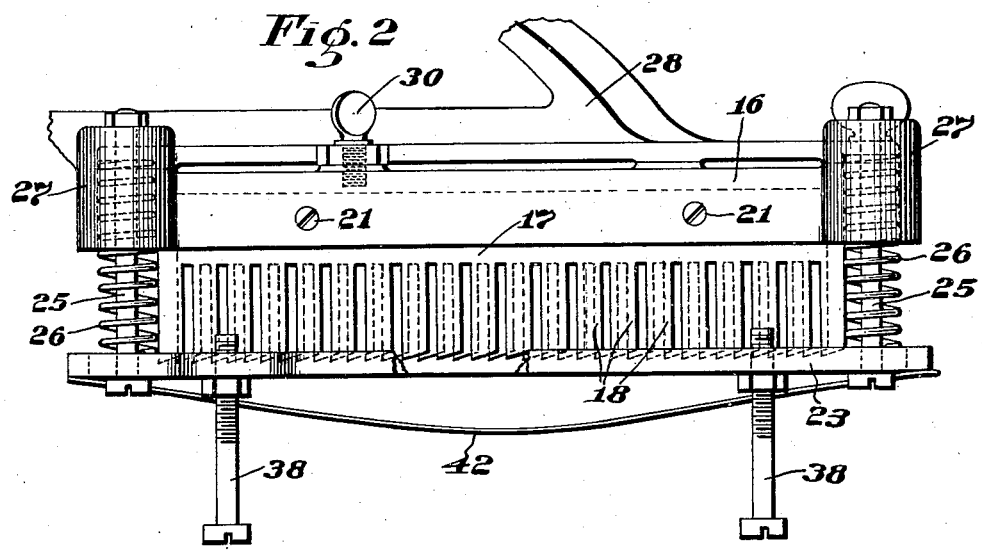
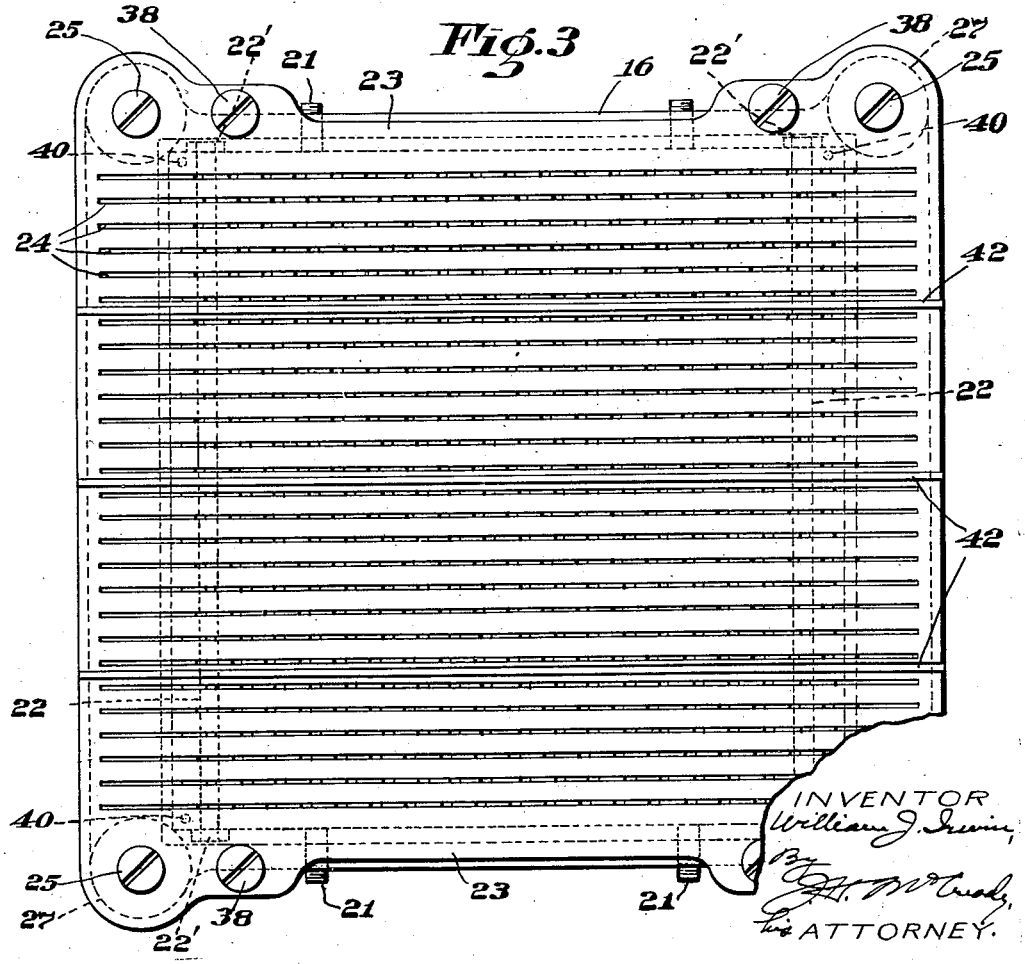
INVENTOR
William J. Irwin
ATTORNEY July 3, 1934.   W. J. IRWIN   1,965,462

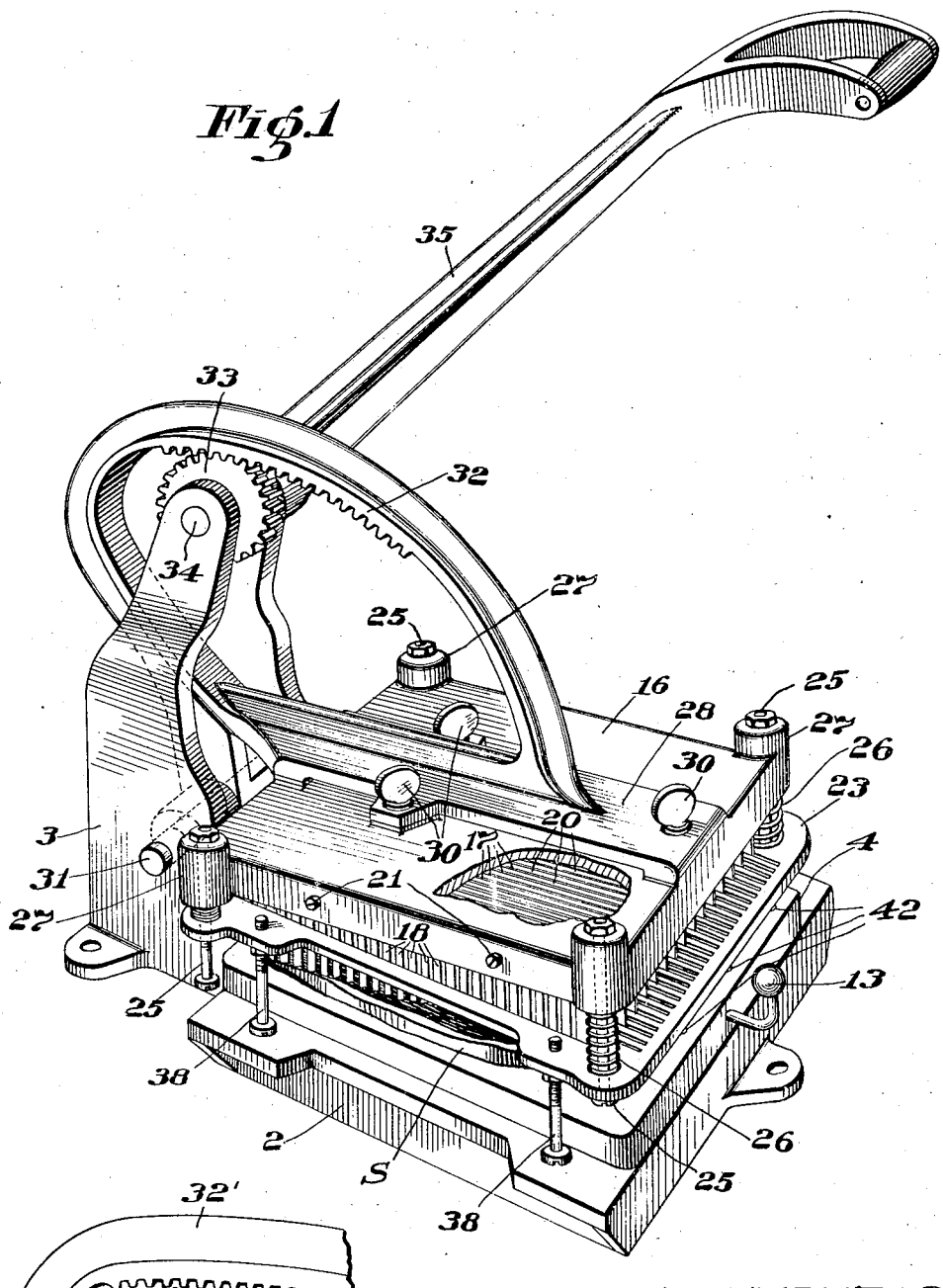

MEAT TENDERING MACHINE

Filed Dec. 8, 1931   4 Sheets-Sheet 3

INVENTOR
William J. Irwin
BY
ATTORNEY.

July 3, 1934.  W. J. IRWIN  1,965,462
MEAT TENDERING MACHINE
Filed Dec. 8, 1931  4 Sheets-Sheet 4

INVENTOR
William J. Irwin,
BY
ATTORNEY.

Patented July 3, 1934

1,965,462

UNITED STATES PATENT OFFICE 1,965,462

MEAT TENDERING MACHINE

William J. Irwin, Medford, Mass., assignor to Walter F. Duffy, Franklin, N. H.

Application December 8, 1931, Serial No. 579,675

8 Claims. (Cl. 17—25)

This invention relates to machines for making a multiplicity of cuts in meat, more especially sliced meats, such as steaks. Machines of this type have been used heretofore to cut at frequent intervals the numerous strong fibres prevailing in the cheaper cuts of meat, particularly steaks, for the purpose of making these cuts more edible and more easily masticated.

The present invention aims to improve machines of this type with a view to making them easier to operate and facilitating the maintenance of such a machine in a clean and thoroughly sanitary condition.

The nature of the invention will be readily understood from the following description when read in connection with the accompanying drawings, and the novel features will be particularly pointed out in the appended claims.

In the drawings,

Figure 1 is a perspective view of a machine constructed in accordance with this invention;

Fig. 2 is a side view of the cutter head and some of the adjacent parts of the machine shown in Fig. 1, certain portions of the head being shown broken away;

Fig. 3 is a bottom view of the cutter head with parts broken away no attempt being made to illustrate accurately the spacing of the teeth of the blades;

Fig. 6 illustrates a modification in the operating mechanism; and

Figure 4:
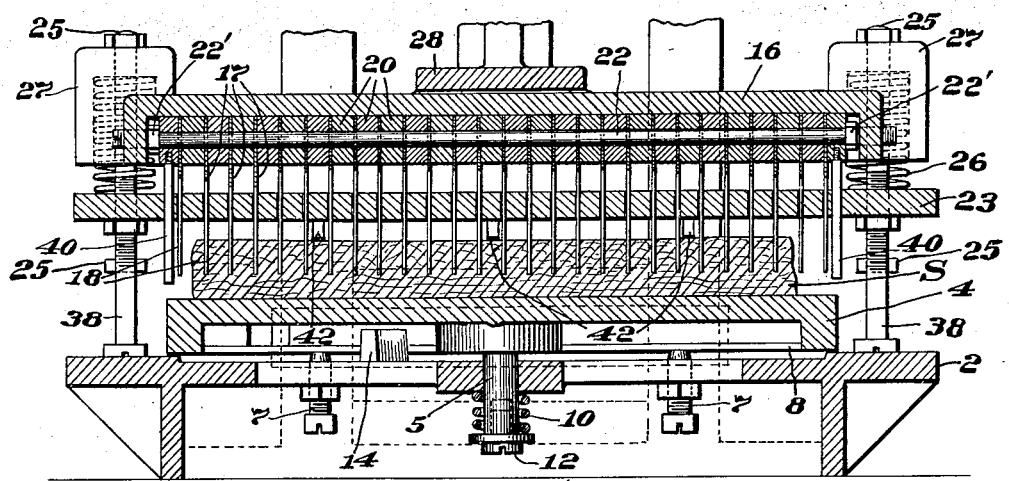
Fig. 4 is a transverse, vertical, sectional view through the machine shown in Fig. 1.

The machine shown in the drawings comprises a frame which includes a base 2 provided at one end with an integral bracket 3. Rotatably mounted on this base is a supporting plate 4 for the meat to be operated upon, the plate being centered on the base by means of a stub shaft 5, Figs. 4 and 5, which enters a hole 6 in the base, and it is supported by four screws 7 threaded through the base and bearing at their upper ends against a depending circular rib or flange 8 with which the plate 4 is provided. By properly adjusting the screws 7 the supporting plate 4 may be set accurately in a horizontal position. A coiled spring 10 encircles the stub shaft 5 and bears against the lower side of the bracket 2 where it acts through the screw 12, threaded into the stub shaft, to hold the plate 4 downwardly against the ends of the screws 7. The plate may be swung through an angle of 90° and in order to facilitate this movement it is provided with a handle 13. A lug 14 extending upwardly from the base 2 is arranged to enter either of two notches 15 in radial ribs spaced 90° apart and formed in the lower face of the plate 4 said lug cooperating with said notches to limit the swinging movement of the plate.

The apparatus for making the desired cuts in the meat comprises a cutter head carrying a multiplicity of knives, and an operating mechanism for moving this head up and down relatively to the support 4. As shown, the cutter head includes a supporting plate 16 provided at its margin with downwardly extending flanges, and a series of knives 17 preferably stamped out of sheet metal so that each knife has a series of teeth or blades 18 integral therewith. These knives are assembled side by side but are suitably spaced apart by spacing bars 20. Long rods 22 extend through the entire series of knives and the bars 20 and are threaded at their opposite ends to receive nuts 22', Fig. 3, which clamp the knives and bars securely together. This entire cutter assembly consisting of the knives and spacing bars may be built up as a complete unit and then secured in the supporting plate 16 by the four set screws 21 which are threaded through the flanges of the supporting plate.

The cutter head also includes a stripper plate 23 which is slotted, as best shown at 24, Fig. 3, to permit the passage therethrough of the blades 18, and this stripper plate is operatively secured to the supporting plate 16 by bolts 25 and springs 26 which encircle the respective bolts, the upper portions of these springs being received in hollow bosses 27 which are provided at the four corners of the supporting plate 16. The springs tend to force the stripper plate away from the supporting plate 16 but permit relative movement of the two plates toward each other, the relative separating movement being limited by the bolts 25.

This entire cutter head assembly is removably secured to the lever or arm 28 of the operating mechanism by means of three thumb screws 30, Fig. 1, so that the cutter head may be quickly removed whenever desired from the operating mechanism, and this entire unit may then be taken out of the machine.

The operating mechanism comprises the lever 28, just mentioned, which is fulcrumed on the machine frame at 31, and a toothed sector 32 preferably made integral with the arm 28 and curved around the fulcrum 31 as an axis. Meshing with this sector is a pinion 33 secured fast on a shaft 34 which is mounted between the upper ends of the arms of the bracket 3, and an operating handle 35 is secured fast to this shaft to revolve the pinion. When the lever 35 is swung backwardly from the position shown in Fig. 1 the cutter head will be raised away from the meat supporting plate 4 and when it is swung in the opposite direction the cutter head will be moved toward the plate, this arrangement providing such a reduction of the movement of the lever that the force is multiplied very substantially and the pressure necessary to force the blades through the meat is easily applied.

In using this machine the cutter head is swung upwardly, the steak is placed on the support 4, and the cutter head then is lowered to the full limit of its downward movement, thus forcing the blades or teeth 18 through the steak. The cutter head then is lifted, the plate 4 is turned through an angle of 90°, and the head then is lowered again as far as possible, thus forcing the blades through the meat and causing them to make cuts at right angles to those made during the first downward movement of the cutter head. The head then is raised and the meat is taken out of the machine.

Figure 5:
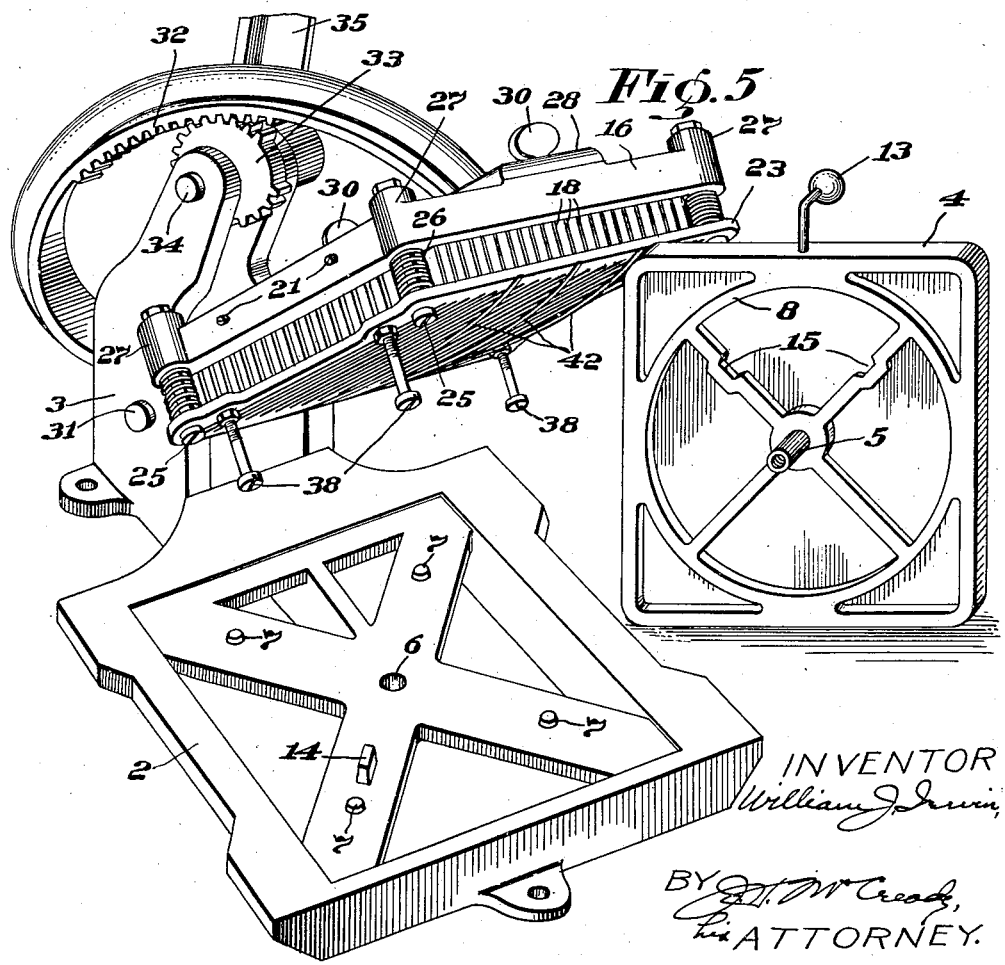
Fig. 5 is a perspective view of the machine partly dismantled.

As the cutter head is lowered the knives 17 and the stripper plate 23 move substantially in unison for a time. The stripper plate, however, carries four stop screws 38 which strike the base 2, as shown in Fig. 4, and arrest the downward movement of the stripper plate, preferably before this plate has come in contact with the meat S, Fig. 4, thus avoiding any compression or flattening of the meat unless it is cut uncommonly thick. As the other parts of the cutter head continue to descend, the blades 18 are forced through the steak, their downward movement continuing until positively arrested by the engagement of four stop pins 40, Fig. 4, with the corners of the supporting plate 4. These pins, as clearly shown in the drawings, are fixed in the cutter head and they project slightly below the lower ends of the blades 18 so that they will strike the supporting plate before the ends of the blades can strike it and be injured. At the same time these stop pins are made of such length that they permit the blades to pass almost entirely through the meat. It should be noted that during this entire cutting movement the blades are so positioned as to be laterally supported by the walls of the slots 24 in the stripper plate 23 so that any tendency to bend the blades laterally due to their contact with a piece of gristle, or other unusually tough portion of the meat, is strongly resisted. Preferably the bolts 25 are so adjusted that the blades are not allowed to move out of their slots even when the cutter head is at the upper limit of its stroke. In other words, the walls of the slots in the stripper plate are constantly so positioned with reference to the blades as to afford lateral support for them in case they become sprung or bent, or in the event that there is any tendency to spring them.

By making the cutting edges of the blades or teeth on their lower ends, as best shown in Fig. 2, and inclining these cutting edges relatively to the vertical edges of the blades, each blade is caused to cut progressively, the point first entering the meat and the cut then travelling along the edge to the opposite corner. This materially reduces the pressure required to force the entire multiplicity of blades into the meat.

During the upward movement of the cutter head the meat usually is carried upwardly by the knives until it strikes the lower face of the stripper plate 23, and it sometimes tends to stick to this plate. In order to overcome this tendency I prefer to equip the stripper plate with several bowed stripper wires 42, best shown in Figs. 2 and 3, these wires extending across the lower face of the stripper plate parallel to and between the blade slots. Each wire is secured rigidly to the stripper plate at one end but is free at the opposite end. They may be made of flat or round spring wire and they act automatically to separate the meat from the stripper plate and cause it to drop back on to the plate 4.

The invention thus provides a machine which is very easy to operate and is quick and positive in action. By removing the thumb screws 30 the entire cutter head unit, including the knives, the stripper plate 23, and the means for holding them in their cooperative relationship, can be removed from the machine and boiled or sterilized in any other convenient manner. These are the parts most likely to be contaminated and are most difficult to clean. By boiling them, however, they can be very thoroughly sterilized with a minimum of trouble. Usually the meat support 4 can be cleaned sufficiently simply by wiping it off, but this plate also can be taken out of the machine quickly simply by removing the screw 12 and it may then be boiled also, if desired. It is, therefore, a simple matter to keep the machine in a thoroughly clean and sanitary condition. The sharpened edges of the teeth or blades 17 remain with the slots in the stripper plate 23 when the cutter unit is removed from the machine so that these edges are guarded against injury and the operator also is protected. If it were not for this arrangement there would be great danger of the operator cutting his hands on the blades 17. Such protection is afforded him both while the cutter head is in its normal or operative position in the machine and also when it is removed from the machine.

The effort required to force the cutter blades or teeth through the meat may be further reduced by using the arrangement illustrated in Fig. 6 in which the pinion 33 has been replaced by a cam-shaped pinion 33', the teeth on the sector 32' being designed to cooperate with the teeth of the cam-shaped pinion. This pinion is so designed, as will be evident from an inspection of Fig. 6, that the leverage applied to the cutter head increases as the head moves downwardly and reaches a maximum during the period in which the blades are being forced through the meat. This arrangement materially reduces the effort required to operate the machine.

Figure 7:
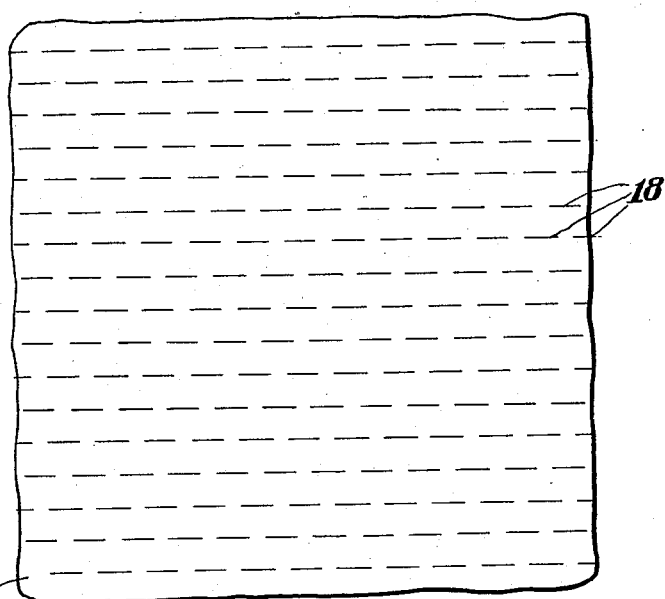
Figs. 7 and 8 are plan views illustrating the cuts made in the meat.
Figure 8:
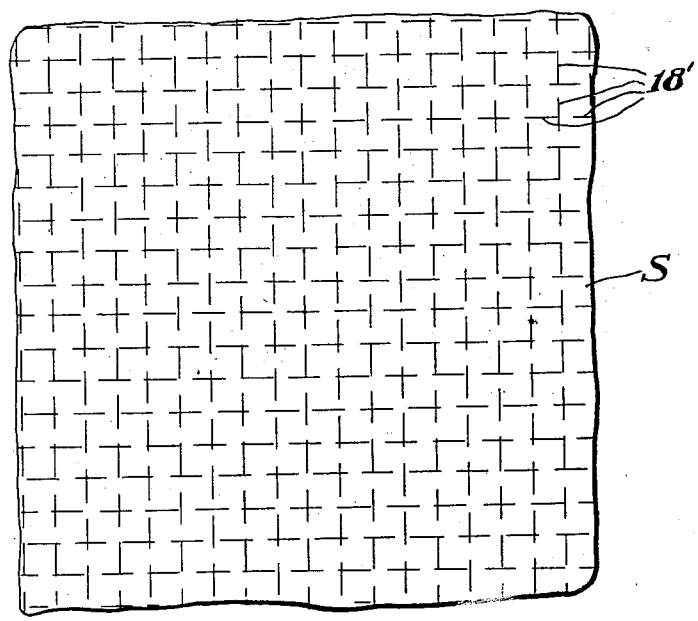

It is important in a machine of this type to cut the meat at such frequent intervals that no tough fibres of any great length will be left unsevered in the part of the meat which is operated upon. For this reason the arrangement of the blades or teeth in the cutter head becomes important. Fig. 7 indicates diagrammatically the cuts made in the meat by the blades at each downward movement of the cutter head, the incision made by each blade 18 being indicated by the short lines 18'. When the cutter head is raised after the first cut, the supporting plate 4 is given a quarter turn, and the cutter head is again moved downwardly to force the blades through the meat, they make another series of cuts at right angles to those made in the first operation. In addition to cutting the meat at closely adjacent intervals, it is also desirable to avoid making continuous cuts so that the steak or other cut of meat operated upon will hold together. For this reason the blades 18 have been spaced both longitudinally from each other in the manner above described. It has been found in prior machines that even when the cuts are made in the general manner above referred to there will be left uncut sections of meat of considerable length which oftentimes contain relatively long, tough fibres. In order to eliminate this condition and to enable the machine to perform its work more thoroughly, I have found that a rather definite arrangement and spacing of the blades is necessary. In the particular cutter head shown the blades of each knife are made one-quarter of an inch in width while the slots which separate adjacent blades are made one-eighth of an inch wide. The knives are spaced apart laterally on center lines located one-quarter of an inch apart. This arrangement produces the "pattern" illustrated in Fig. 8 in which the meat is divided approximately into quarter inch square sections, but each section is connected to one or more adjacent sections. It will be observed that the cuts are so related that no individual straight fibre in the cut section can have a length greater than the diagonal dimension of the area included in two adjacent sections.

While the blade arrangement above described is satisfactory, it is obvious that other arrangements could be used. I have found it preferable, however, to make the width of the blades or teeth at least twice as great as that of the slot which separates it from the next adjacent blade and to space the blades apart by a lateral distance which is not greater than the pitch distance of said blades on their respective knives, the pitch distance being that from the center of one blade to the center of the next adjacent blade of the same knife. Too close a lateral spacing of the knives from each other is undesirable and this spacing should not be less than half the pitch distance above referred to. The fact that the blades or teeth of each knife are staggered with reference to the blades of the next adjacent knife is obvious from an inspection of Fig. 7, it being observed that the center of each blade of one knife is in line with the center of each slot of the next adjacent knife.

While I have herein shown and described a preferred embodiment of my invention, it will be understood that the invention may be embodied in other forms without departing from the spirit or scope thereof.

Having thus described my invention, what I desire to claim as new is:

1. In a meat tendering machine, the combination of a support for the meat; a cutter head movable up and down toward and from said support; said head comprising a multiplicity of blades and a stripper plate for removing the meat from said blades; and additional means carried by said head for loosening the meat from said stripper.

2. In a meat tendering machine, the combination of a support for the meat, a cutter head movable up and down toward and from said support and comprising a multiplicity of blades, operating mechanism for moving said cutter head to force said blades into the meat on said support and to lift said cutter away from said support, a stripper plate slotted to permit the passage therethrough of said blades, means for holding said plate and said blades in cooperative relationship to each other, and stripper wires carried by said plate and serving automatically to loosen the meat from said stripper plate when said cutter head is lifted far enough to move the meat away from said support.

3. In a meat tendering machine, the combination of a support for the meat; a cutter head pivoted for movement up and down relatively to said support; said head comprising a multiplicity of blades and means for supporting said blades; and operating means for said cutter head comprising a toothed sector connected to said head, a toothed cam shaped pinion meshing with the teeth of said sector, and a handle secured to said pinion for rotating the pinion, said pinion being shaped to increase the leverage exerted on said cutter head as said head approaches said support.

4. In a meat tendering machine, the combination of a plate for supporting the meat, a cutter head mounted to move up and down relatively to said plate, a series of knives mounted in said head and extending parallel to, but spaced from, each other, each knife having a series of relatively long narrow parallel blades projecting therefrom and separated by slots whereby said blades are adapted to penetrate the meat for a substantial distance and to make cuts in it when the cutter head is forced downwardly toward said support, and means for supporting said cutter head and said plate for relative rotation through an angle of approximately 90° whereby said blades when forced through the meat the second time after said head and said plate have been relatively rotated to shift the relative position of the meat and blades will make a series of cuts at right angles to the first set of cuts, said blades being so spaced from each other that the meat will be cut into small approximately uniform sections all connected together but in which the length of any individual fibre in the cut section is limited approximately to the diagonal dimension of the area included in two adjacent sections.

5. A cutter for meat tendering machines comprising a cutter head, a series of knives mounted in said head and extending parallel to each other but spaced apart, each knife having a series of relatively long narrow parallel blades or teeth projecting therefrom and separated from each other by slots, each blade having a width at least twice that of the slot which separates it from the next adjacent blades, said blades in adjacent knives being staggered with reference to each other, and adjacent knives being located on center lines spaced apart by a distance less than the pitch distance but more than half the pitch distance of said blades on their respective knives.

6. In a meat tendering machine, the combination of a machine frame; a support for the meat; a cutter head pivoted for movement up and down relatively to said support; said head comprising a multiplicity of blades and means for supporting said blades; said frame including a bracket; and operating means for said cutter head comprising a toothed sector connected to said head, a pinion journaled on said bracket and meshing with the teeth of said sector, and a handle secured to said pinion for rotating it.

7. In a meat tendering machine, the combination of a support for the meat, a cutter head movable up and down toward and from said support and comprising a multiplicity of blades, operating mechanism for moving said cutter head to force said blades into the meat on said support and to lift said cutter away from said support, a stripper plate slotted to permit the passage therethrough of said blades, means for holding said plate and said blades in cooperative relationship to each other, and resilient means for automatically loosening the meat from said stripper plate.

8. In a meat tendering machine, the combination of a machine frame; a support for the meat; a cutter head pivoted for movement up and down toward and from said support; said head including a multiplicity of flat blades extending at approximately right angles to the axis of the pivot for said cutter head, each blade having a series of teeth projecting from the edge thereof; a stripper plate slotted to permit the passage therethrough of said teeth and serving to support said teeth laterally; springs for holding said stripper plate in a projected relationship to said head but permitting it to yield backwardly toward said head when said blades are forced into the meat; said frame including a bracket; and mechanism operable to force said blades through the meat comprising a toothed sector connected rigidly to said cutter head, a pinion pivotally mounted on said bracket and meshing with the teeth of said sector, and a handle connected to said pinion to rotate it.

WILLIAM J. IRWIN.